United States Patent [19]
Tanioka et al.

[11] Patent Number: 6,002,420
[45] Date of Patent: Dec. 14, 1999

[54] IMAGE RECORDING APPARATUS USING SOLID RECORDING DEVICE ARRAY

[75] Inventors: Hiroshi Tanioka, Yokohama; Toshihiko Ohtsubo, Numazu; Mitsuru Amimoto, Yokohama; Mitsuo Shiraishi, Shizuoka-ken, all of Japan

[73] Assignee: Canon Kabushiki Kaisha, Tokyo, Japan

[21] Appl. No.: 08/993,156

[22] Filed: Dec. 18, 1997

[30] Foreign Application Priority Data

Dec. 24, 1997 [JP] Japan .................................. 8-343477

[51] Int. Cl.⁶ .................................................. B41J 2/45
[52] U.S. Cl. ...................... 347/237; 347/238; 347/247; 347/130
[58] Field of Search .................................... 347/237, 247, 347/130, 132, 238; 345/44, 55

[56] References Cited

U.S. PATENT DOCUMENTS

| | | | |
|---|---|---|---|
| 5,063,451 | 11/1991 | Yanagisawa et al. | 347/143 |
| 5,093,675 | 3/1992 | Koumura et al. | 347/109 |
| 5,451,977 | 9/1995 | Kusuda et al. | 345/44 |
| 5,457,488 | 10/1995 | Nakamura et al. | 347/237 |
| 5,600,363 | 2/1997 | Anzaki et al. | 347/237 |

*Primary Examiner*—N. Le
*Assistant Examiner*—Hai C. Pham
*Attorney, Agent, or Firm*—Fitzpatrick, Cella, Harper & Scinto

[57] ABSTRACT

An image recording apparatus which performs time division and driving of 128 recording devices arrayed within an LED chip includes shift registers for sequentially serially outputting 128 bits of continuous pixel data to 56 signal lines, corresponding to each LED, from one line of serially input pixel data row, selectors which perform time division of the 56 pieces of pixel data into 8 times of 7 pieces apiece and then outputs the data, and registers which hold the pixel data output from the selectors for each corresponding LED chip. The image recording apparatus may be used as a recording head for a printer using solid recording devices is simplified, and costs are reduced.

21 Claims, 10 Drawing Sheets

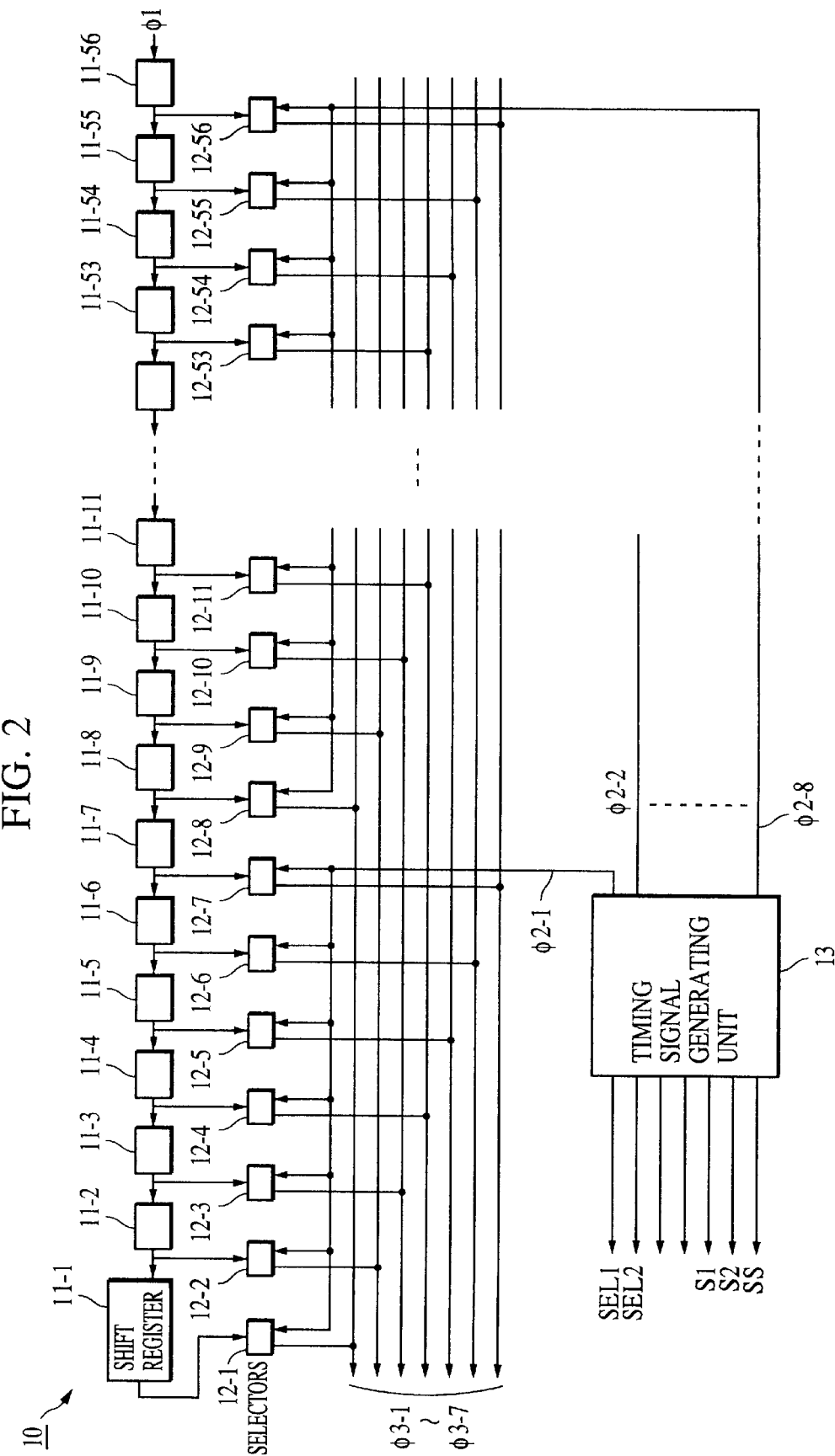

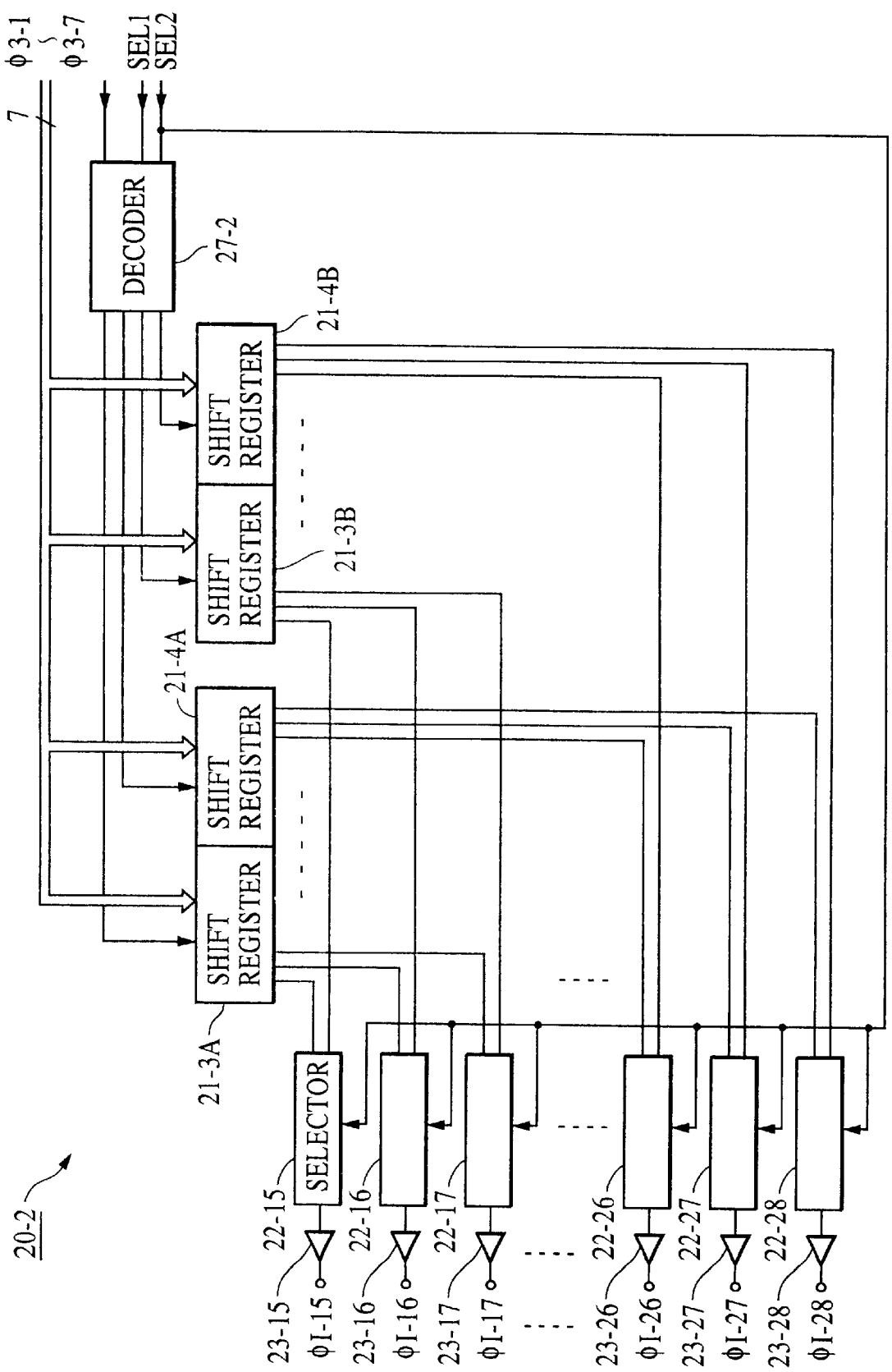

6,002,420

IMAGE RECORDING APPARATUS USING SOLID RECORDING DEVICE ARRAY

BACKGROUND OF THE INVENTION

1. Field of the Invention

The present invention relates to an image recording apparatus which uses a solid recording device array for recording images. The invention may be used in image recording apparatuses such as photocopiers, facsimiles, printers, and so forth.

2. Description of the Related Art

In recent years, a self-scanning recording chip which has functions for scanning solid recording devices contained within the chip has been proposed. FIG. 4 shows an example of this, illustrating an equivalency circuit of a self-scanning LED chip wherein 128 light-emitting devices are arrayed.

In FIG. 4, L1 through L128 denote light-emitting thyristors serving as light-emitting devices, S1 through S128 denote sending thyristors, $\phi$I denotes a signal line wherein pixel data corresponding to the 128 light-emitting devices is serially input, $\phi$SS denotes a signal line for input of a start signal instructing the LED chip to begin operating, and $\phi$S1 and $\phi$S2 denote signal lines for input of shift signals for sequential shifting of the devices which are to emit light. The operation of the self-scanning LED chip will be described with reference to the timing chart shown in FIG. 5.

First, the start signal line $\phi$SS is set from L to H (t1). At the next timing, the shift signal $\phi$S1 is changed from H to L, thereby turning the sending thyristor S1 on (t2), and the gate voltage thereof is anode potential, i.e., approximately 5V. Now, setting $\phi$I to L causes the recording thyristor L1 to emit light (t3), and changing it to H extinguishes the light (t4). If $\phi$I were left at H, the recording thyristor L1 would not emit light during the period from t3 to t4.

Next, the shift signal $\phi$S2 is set from H to L, thereby turning the sending thyristor S2 on (t5). At the next timing, changing the shift signal $\phi$S1 from L to H turns the sending thyristor S1 off (t6), and thus a sending thyristor in the on state is S2 only. Now, setting $\phi$I to L causes the recording thyristor L2 to emit light (t7), and changing it to H extinguishes the light (t8). If $\phi$I were left at H, the recording thyristor L2 would not emit light during the period from t7 to t8.

Next, the shift signal $\phi$S1 is changed from H to L, thereby turning sending thyristor S1 on (t9). At t10, the shift signal $\phi$S2 is switched from L to H, turning sending thyristor S2 off. Setting $\phi$I from H to L at t11 causes recording thyristor L3 to emit light, and changing it to H extinguishes the light at t12.

Repeatedly performing the above operations sequentially scans the 128 sending thyristors S1 through S128, and the recording thyristors L1 through L128 which correspond with each of the sending thyristors emit light in accordance with the pixel data which is input to $\phi$I.

Next, FIG. 6 shows the flow of pixel data in the driving control unit of a known self-scanning LED chip. In FIG. 6, 30-1 through 30-n denote the aforementioned self-scanning LED chips, each including recording thyristors L1–L128, as shown for LED chip 30-1. Reference numerals 40-1 through 40-n denote the shift registers, each 128 bits, and 50-1 through 50-n denoted latch circuits for latching the 128 pieces of pixel data corresponding to the self-scanning LED chips 30-1 through 30-n. Reference numerals 60-1 through 60-n identify driver units for driving self-scanning LED chips 30-1 through 30-n, respectively. The following is a description of the operation thereof.

First, the first line of pixel data, 128×n pieces, is input from the signal line $\phi$1 which is 1 bit in width. This pixel data line is sequentially input to the shift registers 40-1 through 40-n. Once all 128×n pieces of pixel data are input to the shift registers 40-1 through 40-n, the latches 50-1 through 50-n corresponding to the respective shift registers each latch 128 bits of pixel data, following which the second line of pixel data is input to the shift registers 40-1 through 40-n. On the other hand, the latch circuits 50-1 through 50-n serially transfer the 128-bit pixel data held within each respective self-scanning LED chip 30-1 through 30-n, one bit at a time.

Then, as described above, the recording devices are sequentially scanned within each LED chip 30-1 through 30-n, and selectively emit light according to the pixel data which is being sent.

Thus, with this arrangement, each recording device is subjected to time division. Hence, when driving, it becomes necessary to have enough shift registers to convert an entire line of serially-input pixel data into parallel data and output it, and latch units for latching the entire line of pixel data and outputting this to each corresponding recording chip. This latching increases the cost of the recording head. Likewise, the larger number of signal lines connecting the shift registers and the latches have led to high costs.

SUMMARY OF THE INVENTION

Accordingly, it is an object of the present invention to provide an inexpensive image recording apparatus wherein the scale of the recording head of the solid recording device is reduced.

The present invention is directed to an image recording apparatus. The apparatus includes an M number of solid recording device arrays, each of the arrays having an N number of arrayed solid recording devices; drivers, M and N being integers. The apparatus also includes for performing time division of the N number of arrayed solid recording devices which are arrayed within the solid recording device arrays. The apparatus includes shift registers having M output lines for serially outputting N bits of continuous pixel data corresponding to the M number of solid recording device arrays, from one line of pixel data row serially input. Selectors are provided in the apparatus to perform sequential switching of the M bits of pixel data output from the M output lines of the shift registers L bits at a time as pixel data, and perform time-division output thereof. The apparatus also includes registers which hold the L bits of pixel data output from the selectors, for each of the solid recording device arrays corresponding with each piece of pixel data. The driver drives the recording devices within the solid recording device arrays according to the pixel data held within the register.

Other objects, features, and advantages of the present invention will become clear from the description thereof in the following specification and the accompanying drawings.

BRIEF DESCRIPTION OF THE DRAWINGS

FIG. 2 is an explanatory diagram of the I/F circuit unit according to the present invention;

FIGS. 3A–3G are an explanatory diagrams of the driving IC chips according to the present invention;

DESCRIPTION OF THE PREFERRED EMBODIMENT

The following is a detailed description of an embodiment of the present invention.

Figure 1:
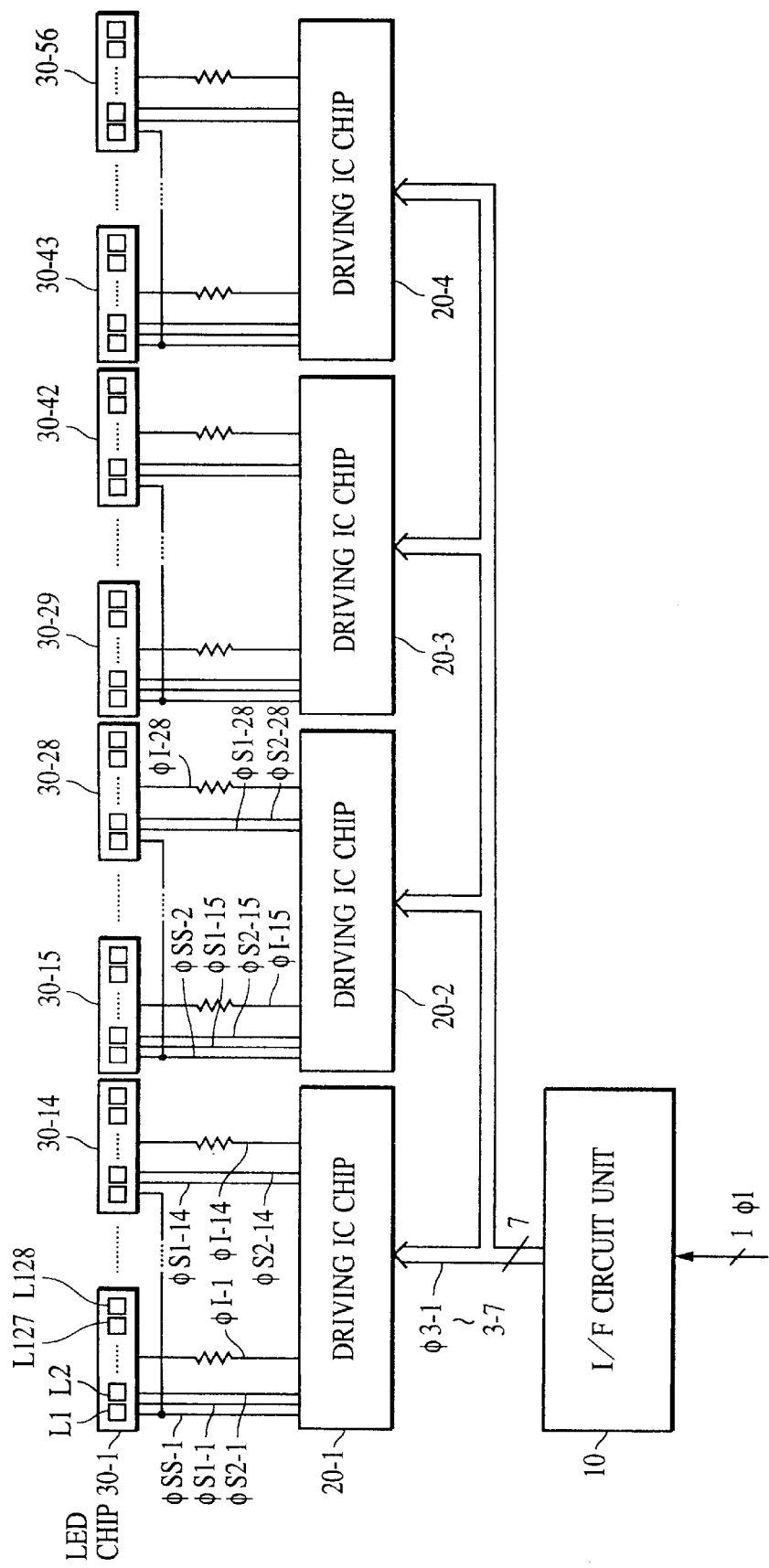
FIG. 1 is a schematic drawing of a recording head of an LED printer according to the present invention.

FIG. 1 is a schematic diagram illustrating a recording head comprised of self-scanning LED chips 30-1 through 30-56, driving IC chips 20-1 through 20-4, and I/F circuit unit 10.

To record onto A3 size paper, for example, recording devices must be arrayed over a width of 300 mm which is equivalent to the short side of the A3 paper, and to record onto A4 paper, the devices must cover a width of 216 mm. In the event that the recording is to be performed at a resolution of 600 dpi, 56 LED chips containing 128 recording devices each are required to record onto A3 size paper, and 40 LED chips are required for recording onto A4 size paper.

Now, a method may be conceived wherein, in order to prevent waste in the cases of both A3 and A4, the number of LED chips driven by a single driving IC chip is set at 8, which is the greatest common divisor of 56 and 40, so that 7 driving IC chips operate in the case of A3 size paper, and 5 in the case of A4 size paper. However, it is difficult to mount 7 driving IC chips over the width of A3 size paper.

Accordingly, the present embodiment has been configured such that 14 LED chips are driven by each of 4 driving IC chips 20-1 through 20-4. That is, as shown in FIG. 1, driving IC chip 20-1 drives LED chips 30-1 through 30-14, driving IC chip 20-2 drives LED chips 30-15 through 30-28, driving IC chip 20-3 drives LED chips 30-29 through 30-42, and driving IC chip 20-4 drives LED chips 30-43 through 30-56. With this arrangement, 4 driving IC chips can be mounted over the width of A3 size paper. Also, in the case of A3 size paper, driving 4 driving IC chips is sufficient, and in the case of A4 size paper, driving 3 driving IC chips is sufficient, although 2 LED chips will be driven unnecessarily. Thus, the present embodiment has been configured such that each of the driving IC chips 20-1 through 20-4 drive 14 LED chips.

For example, the driving IC chip 20-1 outputs each of the signals to the LED chip 30-1 via the pixel data line φI-1 (equivalent to the aforementioned φI), start signal line φSS-1 (equivalent to φSS), and shift signal lines φS1-1 and φS2-1 (equivalent to φS1 and φS2). Also, the driving chip 20-1 outputs each of the signals to the LED chip 30-2 via the pixel data line φI-2, start signal line φSS-1, and shift signal lines φS1-2 and φS2-2, and so on, and outputs each of the signals to the LED chip 30-14 via the pixel data line φI-14, start signal line φSS-1, and shift signal lines φS1-14 and φS2-14. Now, since φSS-1 which corresponds to the start signal line is common to all of the LED chips 30-1 through 30-14, the output from the driving IC chip 20-1 is single, and is connected to LED chips 30-1 through 30-14 in a parallel manner. In order to adjust the driving current value, φI-1 which sends pixel data is connected to a cathode shared between LED chips, via either an external chip resistor or a built-in resistor of the driving IC chip 20-1.

Further it is possible that the resistor is connected to φS1-1–S1-14 or φS2-1–S2-14 in the same manner as φI-1 to adjust the driving current value, and where the resistor is built in the driving IC chip 20-1, the resistor value is changed by an external voltage.

FIG. 2 is a detailed diagram illustrating the I/F circuit unit 10 for supplying pixel data to the driving IC chips 20-1 through 20-4.

In FIG. 2, 11-1 through 11-56 are each shift registers comprised of 128 1-bit shift registers and a 128-bit latch, the shift registers being arrayed serially, and with raster pixel data for one line being input from the shift register 11-56 side via φ1 shown also in FIG. 1.

Reference numerals 12-1 through 12-56 denote selectors, and pixel data output bit-by-bit from the shift registers 11-1 through 11-56 is input thereto. These selectors 12-1 through 12-56 are connected to output permission signal lines φ2-1 through 2-8, 7 consecutive selectors at a time, and the selectors 12-1 through 12-56 output pixel data to the output lines φ3-1 through 3-7, once output permission signals are output from the timing signal generating unit 13 via φ2-1 through 2-8. Reference numeral 13 denotes a timing signal generating unit for generating the various signals.

With regard to these, first, one line of pixel data, i.e. a raster pixel data row of 128×14×4 pixels, is serially input from φ1, and sequentially input 128 bits each to shift registers 11-1 through 11-56. Then, the shift registers 11-1 through 11-56 output the first one bit each of the continuous 128-bit pixel data rows within the one line worth of pixel data row, i.e., the 56 pieces of pixel data corresponding to the recording device L1, within the LED chips 30-1 through 30-56, this output being sent to the respective selectors 12-1 through 12-56.

Further, at the next timing, the shift registers 11-1 through 11-56 output the second one bit each of the continuous 128-bit pixel data rows within the one line worth of pixel data row, i.e., the 56 pieces of pixel data corresponding to the recording device L2, within the LED chips 30-1 through 30-56, this output being sent to the respective selectors 12-1 through 12-56 in a parallel manner. Subsequently, pixel data is output to each recording device L3 in the same manner, the shift registers 11-1 through 11-56 thereby having output the continuous 128-bit pixel data according to each LED chips 30-1 through 30-56, to each of the selectors 12-1 through 12-56, in a serial manner.

The 56 pieces of pixel data input to the selectors 12-1 through 12-56 in this way are selected 7 at a time synchronously with the output permission signal output from the timing generating unit 13 via φ2-1 through φ2-8, and output to φ3-1 through φ3-7. Now, one output permission signal is connected to the 7 continuous selectors in a parallel manner, and by means of the timing generating unit 13 turning φ2-1 through 2-8 on sequentially, the selectors are selected 7 at a time, 12-1 through 12-7, 12-8 through 12-14, and so on through 12-50 through 12-56. In other words, the selectors 12-1 through 12-56 output the pixel data output from each output line of the shift registers 11-1 through 11-56 7 at a time, time-divided into 8 times.

For example, in the event that the output permission signal line φ2-1 goes on, pixel data corresponding to the recording device L1 within each of the LED chips 30-1 through 30-7 is output to the pixel data lines φ3-1 through 3-7. Next, when the output permission signal line φ2-2 becomes H, the pixel data corresponding to the recording device L1 within each of the LED chips 30-8 through 30-14 is output. Subsequently, the output permission signal lines φ2-3 through 2-8 become H, and the pixel data corresponding to the recording device L1 within each of the LED chips 30-15 through 30-56 is output.

Once all of the pixel data corresponding to the recording device L1 within each of the LED chips 30-1 through 30-56 is output to φ3-1 through φ3-7, the pixel data stored in each of the shift registers 11-1 through 11-56 is shifted by one bit, and the pixel data corresponding to the recording device L2 within each of the LED chips 30-1 through 30-56 is output to the selectors 12-1 through 12-56. Next, in the event the output permission signal φ2-1 goes on for the second time, data corresponding to the recording device L2 within each of the LED chips 30-1 through 30-7 is output to the pixel data lines φ3-1 through 3-7.

Following the same pattern, at the point that φ2-8 goes on for the 128th time, all of the pixel data for one line has been output to φ3-1 through 3-7.

Next, the four driving IC chips 20-1 through 20-4 will be described with the driving IC chip 20-1 as an example. FIGS. 3A–3G illustrate driving IC chips 20-1 through 20-4.

One driving IC chip drives 14 LED chips according to 14 pixels worth of pixel data output in two sets from the I/F circuit unit 10 via φ3-1 through 3-7. In FIG. 3A, 21-1A through 21-2B denote 7-bit registers, 22-1 through 22-14 denote selectors, 23-1 through 23-14, 24, 25-1 through 25-14, and 26-1 through 26-14 denote drivers, and 27 denotes a decoder.

The driving IC chip 20-1 has two sets of registers, and is configured to alternately switch between a storing operation and an output operation. That is, in parallel with pixel data being stored to the registers 21-1A and 21-2A, pixel data is output from the registers 21-1B and 21-2B. And parallel with pixel data being stored to the registers 21-3 and 21-4, of driving IC chip 20-2 shown in FIG. 3B, pixel data is output from the registers 21-1 and 21-2.

Regarding the storing operation, in the event that seven pixels worth of pixel data are input to the signal lines φ3-1 through 3-7 in a parallel manner, these 7 pieces of pixel data are stored in one of the registers 21-1A through 21-2B. Now, 2-bit select signals SEL1 and SEL2 (e.g., 00, 01, 11, 10) are sent as signals to select a register for storing the data, the select signals having been generated by the timing signal generating unit 13 within the I/F circuit unit 10. The decoder 27-1 decodes these, outputs "on" to the register to which the pixel data is to be stored, and the register stores the pixel data input from the I/F circuit unit 10 via φ3-1 through 3-7. Also, regarding the output operation, the upper bit of the 2-bit select signals, e.g., SEL2, is input to the selectors 22-1 through 22-14, so that the selectors 22-1 through 22-14 alternately select output from the register 21-1 and 21-2, or the registers 21-3 and 21-4.

Thus, pixel data is supplied in a parallel manner to the 14 LED chips 30-1 through 30-14 connected to the driving IC chip 20-1.

The following is a detailed description of these operation flows.

First, seven pieces of pixel data corresponding to the recording device L1 within each of the recording chips 30-1 through 30-7 are input from the I/F circuit unit 10 via signal lines φ3-1 through 3-7. Now, by means of the select signals specifying register 21-1A, the seven pieces of pixel data are stored in register 21-1A. At the next timing, pixel data corresponding to the recording device L1 within each of the recording chips 30-8 through 30-14 is stored in the register 21-2A.

Further, the pixel data input at the next timing, corresponding to the recording device L1 within each of the LED chips 30-15 through 30-21, is stored in a register 21-3A of driving IC chip 20-2, and further, the pixel data input at the next timing, corresponding to the recording device L1 within each of the recording chips 30-22 through 30-28, is stored in a register 21-4A of driving IC chip 20-2.

In the same way, finally, the pixel data corresponding to the recording device L1 within each of the recording chips 30-50 through 30-56 is stored in a register 21-8A of the driving IC chip 20-4, thus storing all of the pixel data corresponding to the recording device L1 within each of the recording chips 30-1 through 30-56 in registers 21-1A through 21-8A.

Then, owing to SEL2, the data stored in the registers 21-1A through 21-8A is simultaneously selected by the selectors 22, sent to the corresponding drivers 23, thereby driving the respective recording chip recording devices L1.

Parallel with this output operation, i.e., with the output of pixel data corresponding to the recording device L1 within each of the recording chips 30-1 through 30-56, the pixel data corresponding to the recording device L2 within each of the recording chips 30-1 through 30-56 is input. This pixel data is also sent through φ3-1 through φ3-7, as described above. This pixel data is stored in the registers 21-1B through 21-8B in the same manner as L1.

Thus, by means of the registers 21-1A through 21-8A and the registers 21-1B through 21-8B conducting the output operation and storing operation alternately, one line of pixel data is all output.

The pixel data selected by each selector 22-1 through 22-14 and output is input to each driver 23-1 through 23-14, and subsequently, the driving current for driving each of the LED chips 30-1 through 30-56 is turned on or off.

The arrangement and operation of the features of driving IC chips 20-2 are substantially the same as described above for driving IC chip 20-1. The operation of the apparatus including driving IC chips 20-1 through 20-4, with registers 21-1A through 21-8B can thus be understood from the foregoing description.

Figure 3A:
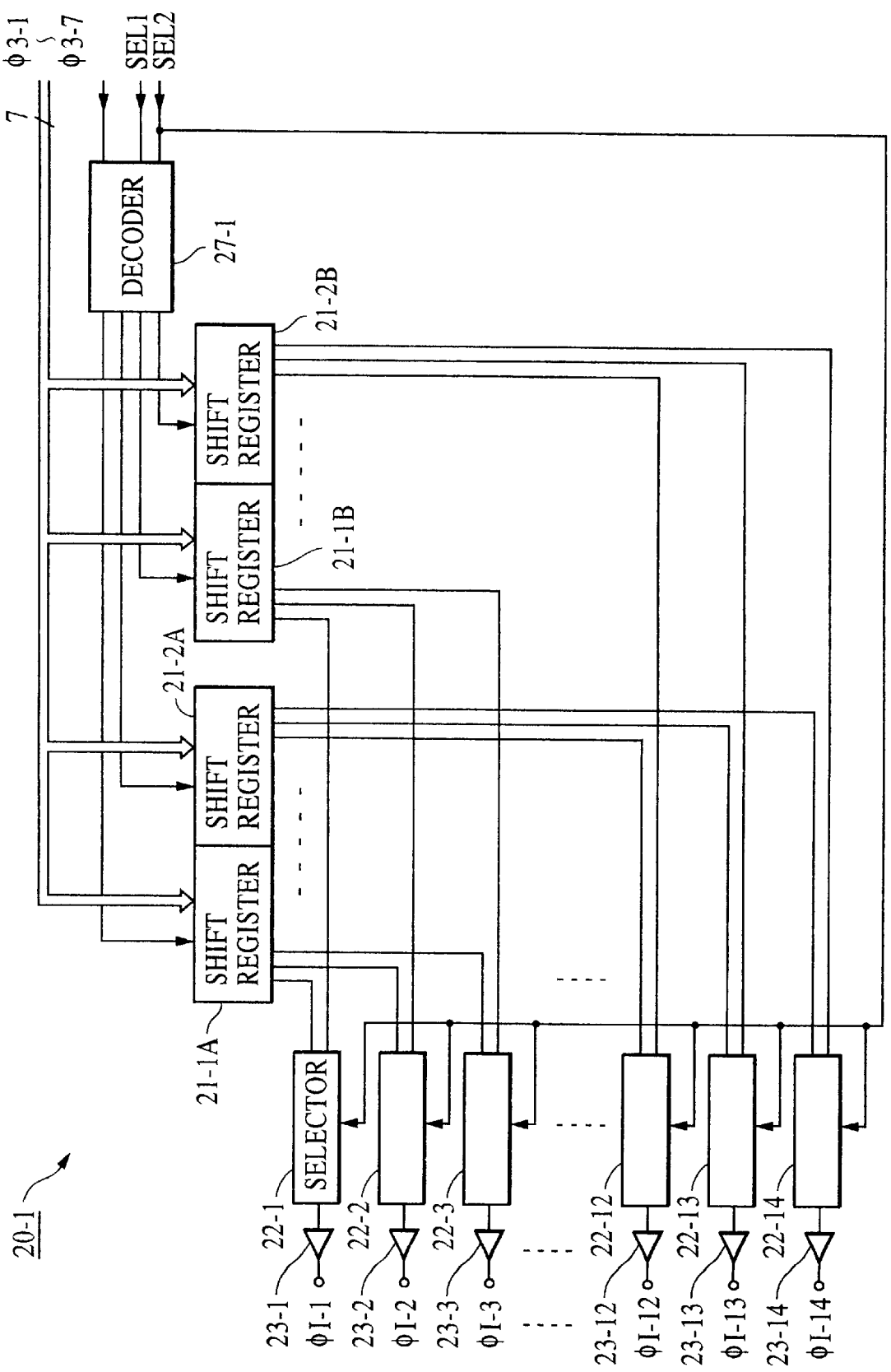
Figure 3C:
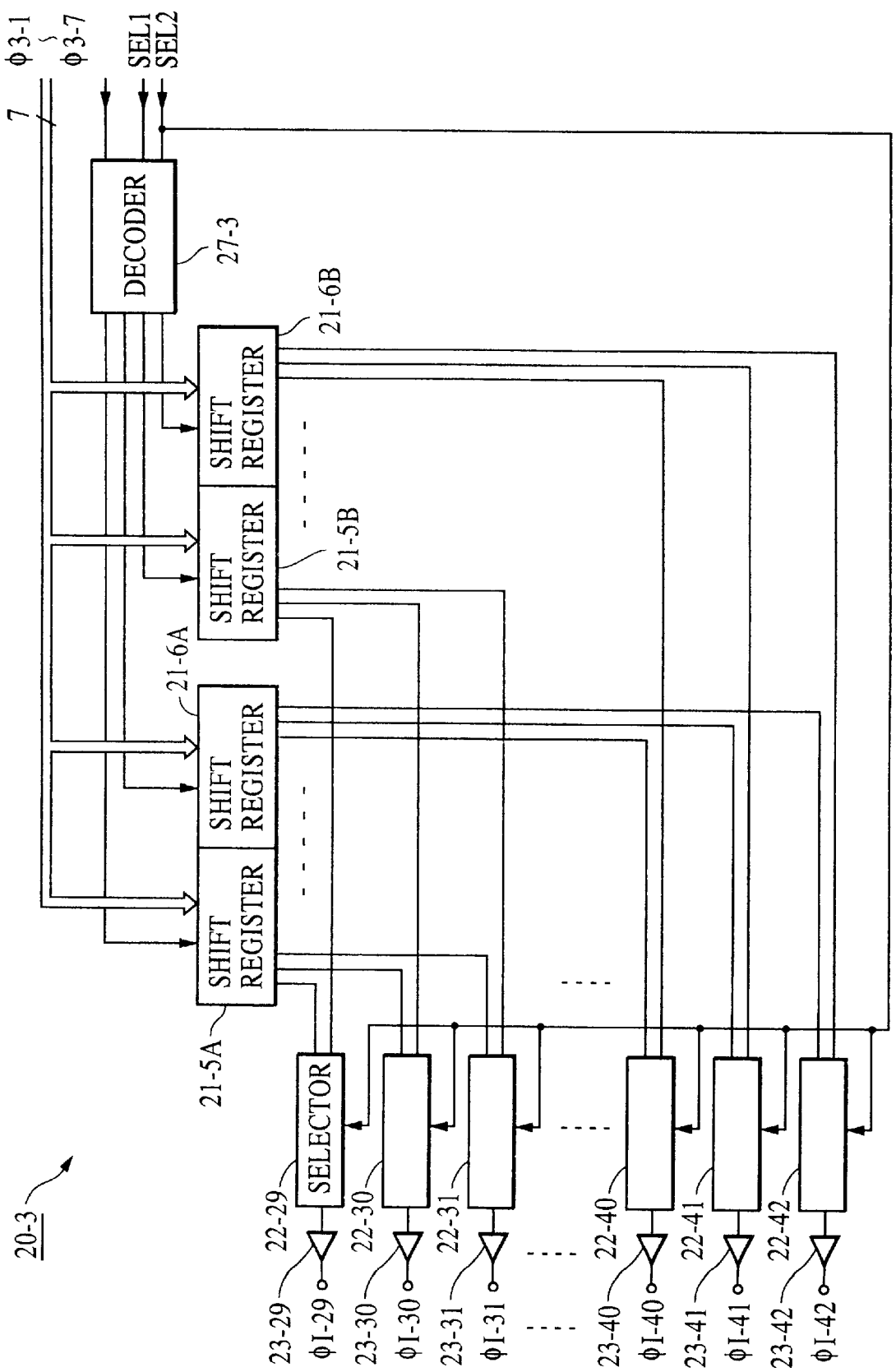
Figure 3D:
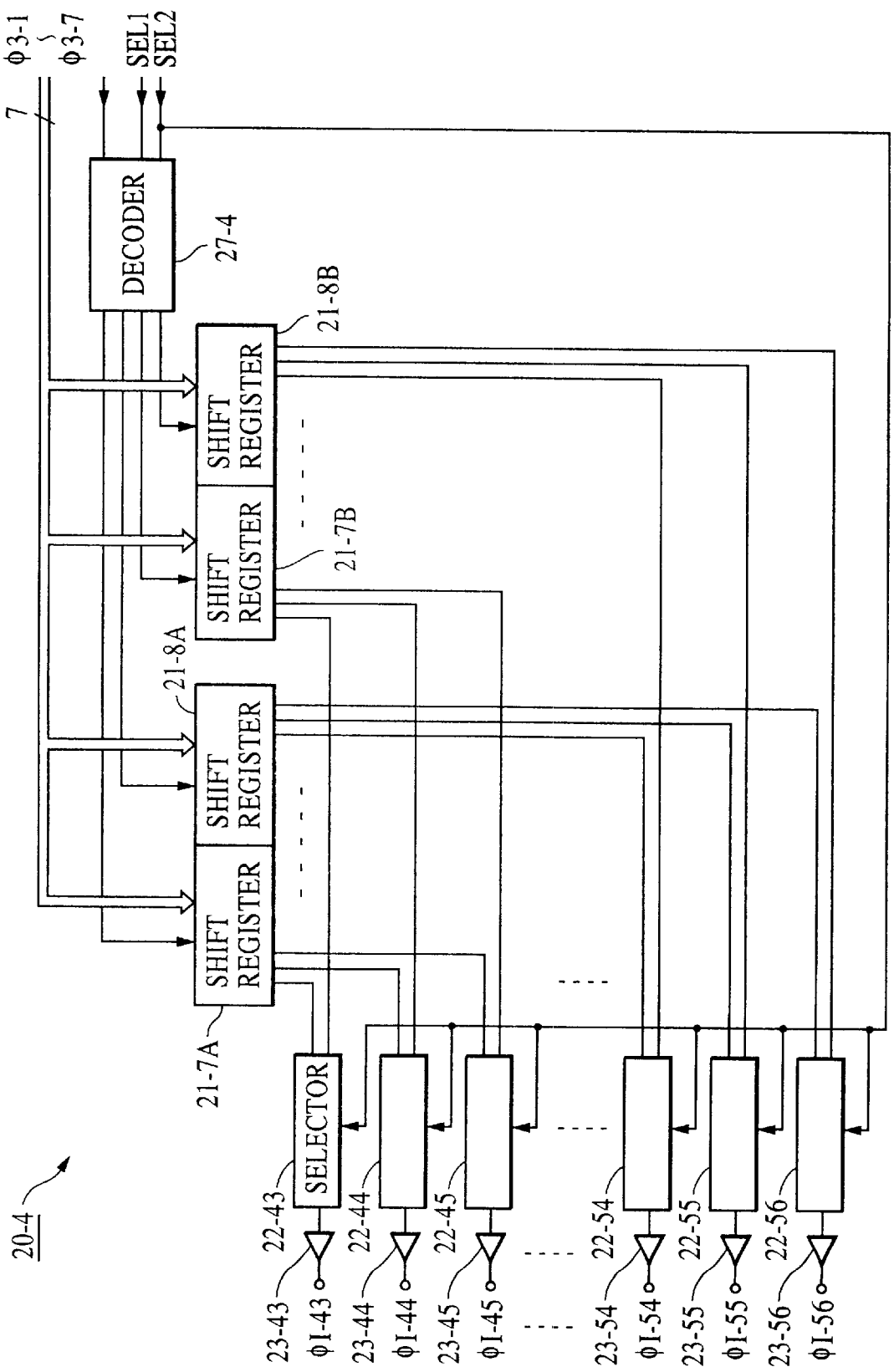
Figure 3E:
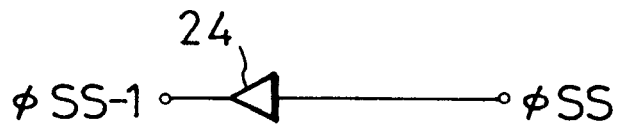
Figure 3F:
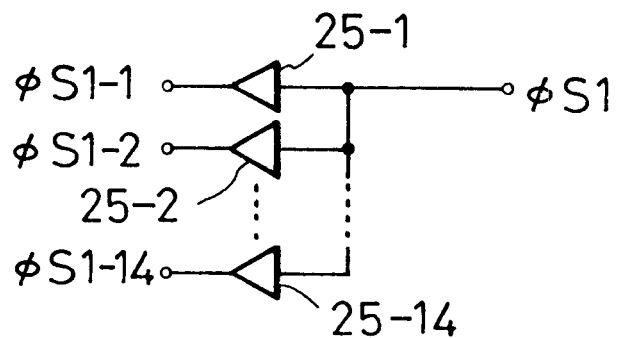
Figure 3G:
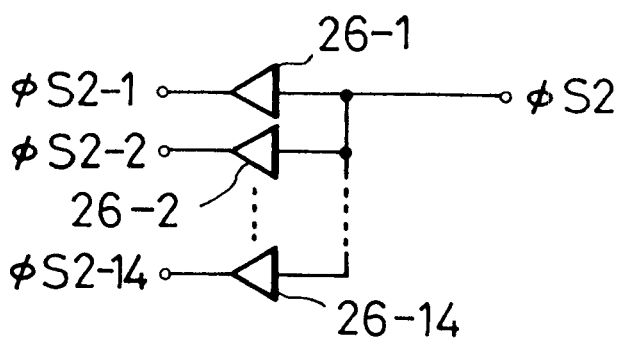
Figure 4:
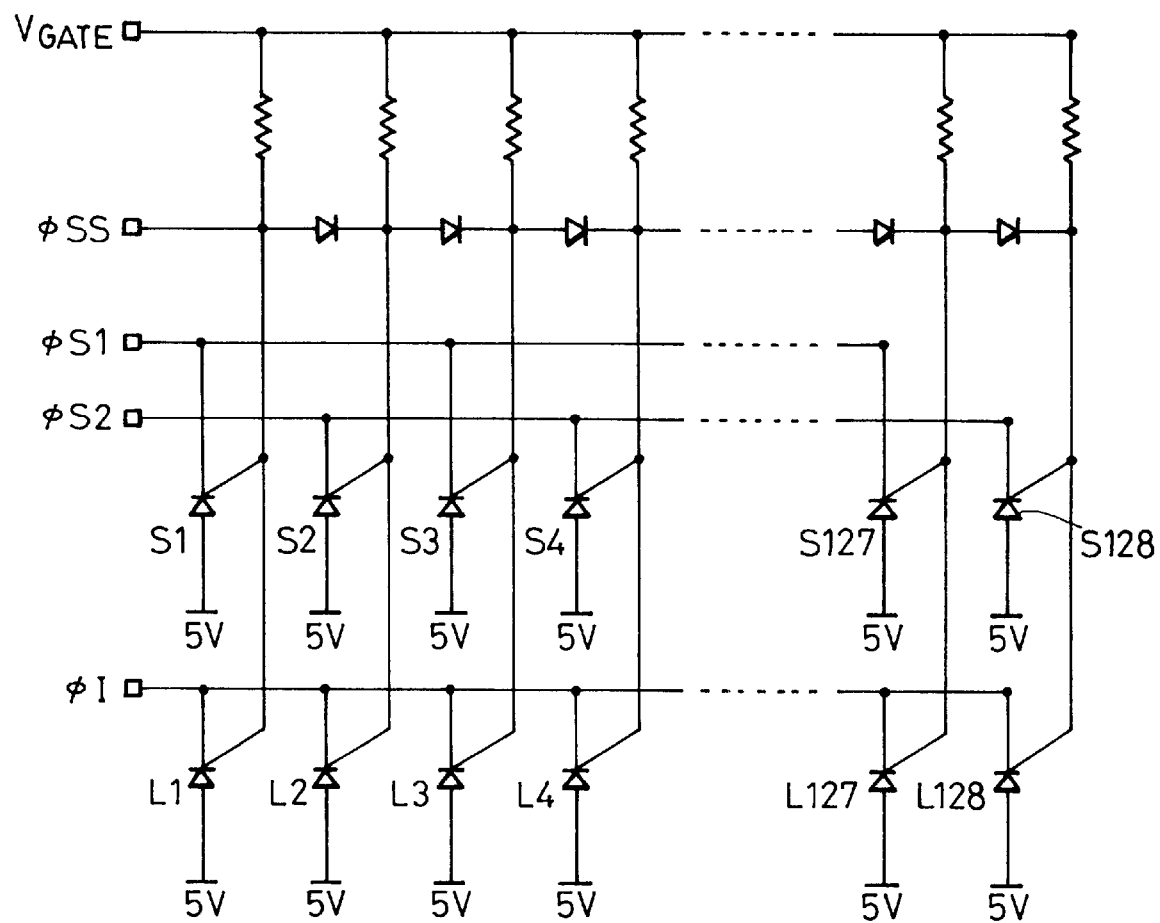
FIG. 4 is an explanatory diagram of a conventional self-scanning LED chip.
Figure 5:
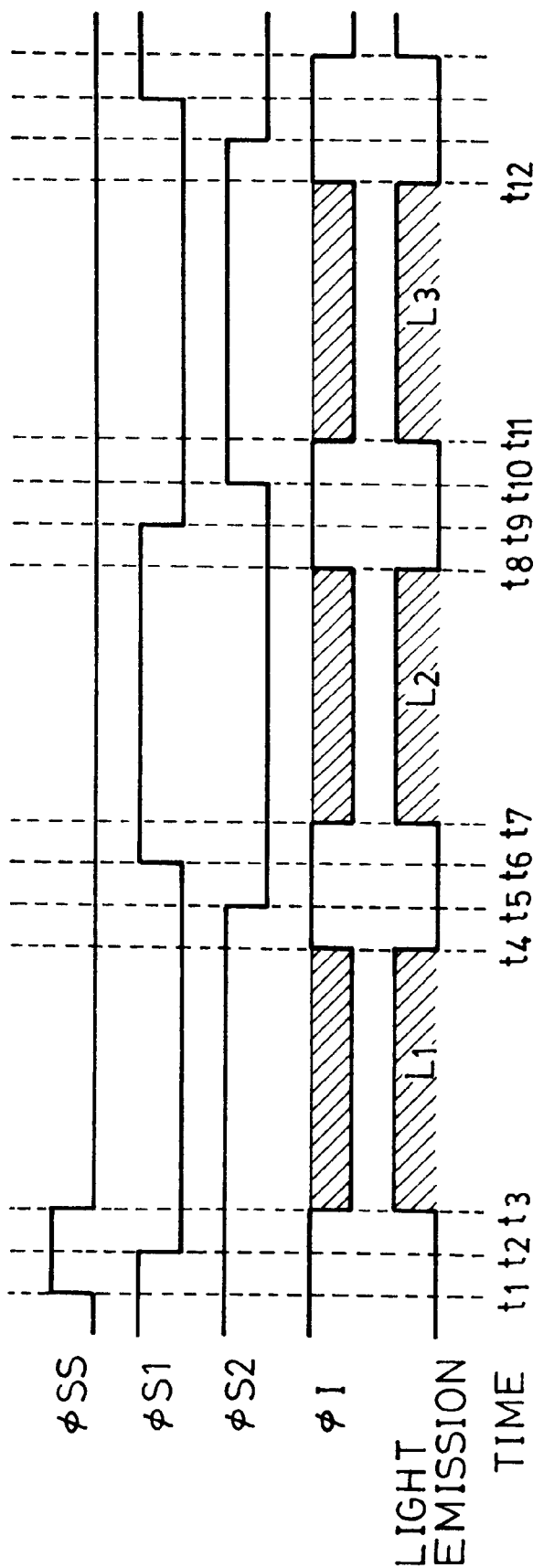
FIG. 5 is a timing chart showing the operation of a conventional self-scanning LED chip.
Figure 6:
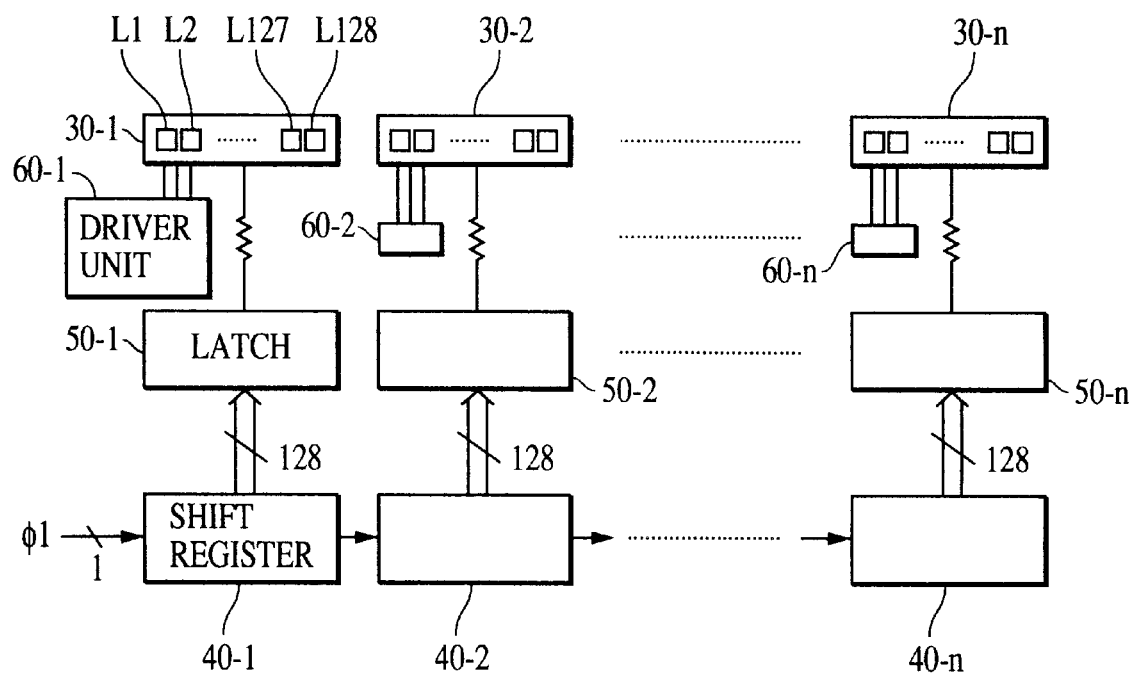
FIG. 6 is a schematic diagram of a known LED printer recording head.

Also, regarding φSS, φS1, and φS2 generated by the timing signal generating unit 13 within the I/F circuit unit 10, the driving current for driving each of the LED chips is turned on or off, by means of drivers 24, 25-1 through 25-14, and 26-1 through 26-14 shown in FIGS. 3E, 3F and 3G, respectively within the driving IC chips 20-1 through 20-4.

Each of the LED chips 30-1 through 30-56 is constructed in the same manner as the self-scanning LED arrayed described with the known example.

According to the above-described operation of each component, each of the recording devices are turned on or off according to pixel data, and the irradiated light thereof is imaged on a photosensitive member, for example, and a desired image can be recorded on recording paper using a well-known electrophotography process.

Other Embodiments

Although the above embodiment has been described with reference to a construction wherein a single driving IC chip drives 14 LED chips, an arrangement wherein a single driving IC chip drives 8 LED chips may be employed instead. In this case, the number of driving IC chips to be driven is 7 for A3 size paper and 5 for A4 size paper, with the redundancy for either being zero. In this case, with the registers 21 in FIG. 3 as each 4 bits in width, the matrix of the I/F circuit unit shown in FIG. 2 is 4*14. Also, with the registers 21 in FIG. 3 as each 8 bits in width, the matrix of the I/F circuit unit shown in FIG. 2 is 8*7.

Also, an arrangement wherein a single driving IC chip drives 7 LED chips may be employed instead. In this case, the number of driving IC chips to be driven is 8 for recording an image equivalent to A3 size paper, and 6 for A4 size paper.

Also, the above-described embodiment involves the shift registers 11-1 through 11-56 within the I/F circuit unit 10 sending pixel data at a 1-bit width, but the arrangement may have the pixel data being sent at 4- to 16-bit widths.

Further, in the above embodiment, the description involved an example of self-scanning LED chips which have self-scanning functions within the recording chip being employed for the recording chip, but this may instead be a recording chip capable of time-division driving having the same scanning functions either internal or external to the recording chip.

Moreover, other light-emitting devices or heat-emitting devices may also be used as the recording devices.

As described above, by performing serial output of pixel data corresponding to each solid recording device array from the serially input one line of pixel data, the output being performed for each solid recording device array, and by the selectors performing time division of the plurality of outputs and transferring these to holding means, the size of the recording head circuit can be reduced, and an inexpensive image recording apparatus can be provided.

Although several preferred embodiments of the present invention have been described above, the present invention is by no means limited to these, and various modifications and arrangements may be made without departing from the scope of the following claims.

What is claimed is:

1. An image recording apparatus, comprising:
   an M number of solid recording device arrays, each of said arrays comprising an N number of arrayed solid recording devices, M and N being positive integers;
   a plurality of drivers for performing time division of the N number of arrayed solid recording devices which are arrayed within said solid recording device arrays;
   shift registers having an M number of output lines corresponding to said M number of solid recording device arrays, each output line serially outputting an N number of continuous pixel data to be sent to each solid recording device array from one line of a pixel data row serially input;
   selectors which perform sequential switching of the M number of pixel data output from said M number of output lines of said shift registers L number at a time as pixel data, and which perform time-division output thereof, L being a positive integer; and
   registers which hold the L number of pixel data output from said selectors, for each of said solid recording device arrays corresponding to each piece of pixel data,
   wherein each of said plurality of drivers drives said recording devices within said solid recording device arrays according to the pixel data held within said registers.

2. An image recording apparatus according to claim 1, each of said plurality of drivers comprising 4 driving chips, each of said 4 driving chips driving 14 of said solid recording device arrays.

3. An image recording apparatus according to claim 1, each of said plurality of drivers comprising 3 driving chips, each of said driving chips driving 14 of said solid recording device arrays.

4. An image recording apparatus according to claim 1, each of said plurality of drivers comprising 7 driving chips, each of said driving chips driving 8 of said solid recording device arrays.

5. An image recording apparatus according to claim 1, each of said plurality of drivers comprising 5 driving chips, each of said driving chips driving 8 of said solid recording device arrays.

6. An image recording apparatus according to claim 1, each of said plurality of drivers comprising 8 driving chips, each of said driving chips driving 7 of said solid recording device arrays.

7. An image recording apparatus according to claim 1, each of said plurality of drivers comprising 6 driving chips, each of said driving chips driving 7 of said solid recording device arrays.

8. An image recording apparatus according to claim 1, said M solid recording device arrays internally having scanning functions.

9. An image recording apparatus according to claim 1, said solid recording devices being light-emitting devices.

10. An image recording apparatus according to claim 9, said light-emitting devices being light-emitting thyristors.

11. An image recording apparatus, comprising:
    an M number of solid recording device arrays, each of said arrays comprising an N number of arrayed solid recording devices, M and N being positive integers;
    driving means for performing time division of the N number of arrayed solid recording devices which are arrayed within said solid recording device arrays;
    output means for serially outputting an N number of continuous pixel data to be sent to each solid recording device array from one line of a pixel data row serially input;
    selecting means which performs sequential switching of the M number of pixel data output from said output means L number at a time as pixel data, and performs time-division output thereof, L being a positive integer; and
    holding means which holds the L number of pixel data output from said selecting means, for each of said solid recording device arrays corresponding to each piece of pixel data,
    wherein said driving means drives said recording devices within said solid recording device arrays according to the pixel data held within said holding means.

12. An image recording apparatus according to claim 11, said driving means comprising 4 driving chips, each of said driving chips driving 14 of said solid recording device arrays.

13. An image recording apparatus according to claim 11, said driving means comprising 3 driving chips, each of said driving chips driving 14 of said solid recording device arrays.

14. An image recording apparatus according to claim 11, said driving means comprising 7 driving chips, each of said driving chips driving 8 of said solid recording device arrays.

15. An image recording apparatus according to claim 11, said driving means comprising 5 driving chips, each of said driving chips driving 8 of said solid recording device arrays.

16. An image recording apparatus according to claim 11, said driving means comprising 8 driving chips, each of said driving chips driving 7 of said solid recording device arrays.

17. An image recording apparatus according to claim 11, said driving means comprising 6 driving chips, each of said driving chips driving 7 of said solid recording device arrays.

18. An image recording apparatus according to claim 11, said M solid recording device arrays internally having scanning functions.

19. An image recording apparatus according to claim 11, said solid recording devices being light-emitting devices.

20. An image recording apparatus according to claim 19, said light-emitting devices being light-emitting thyristors.

21. A method of image recording by using M solid recording device arrays, each of said arrays comprising N arrayed solid recording devices, M and N being positive integers, said method comprising the steps of:

serially outputting N bits of continuous pixel data to be sent to each solid recording device array from each M number of output lines corresponding to the M solid recording device arrays, based on one line of a pixel data row serially input;

performing sequential switching of the M number of pixel data, output in said serially outputting step, L number at a time as pixel data, and performing time-division outputting thereof using selecting means, L being a positive integer;

holding the L number of pixel data output from the selecting means, for each of the solid recording device arrays corresponding to a piece of pixel data; and time division driving the N arrayed solid recording devices within the solid recording device arrays according to the pixel data held in said holding step.

* * * * *

UNITED STATES PATENT AND TRADEMARK OFFICE
CERTIFICATE OF CORRECTION

PATENT NO. : 6,002,420
DATED : December 14, 1999
INVENTOR(S) : TANIOKA ET AL.

It is certified that error appears in the above-identified patent and that said Letters Patent is hereby corrected as shown below:

Title page item,
[57] ABSTRACT:
  Line 11, "devices is" should read --devices. The construction thereof is--.

COLUMN 2:
  Line 36, "devices; drivers," should read --devices,--.
  Line 37, "includes for" should read --includes drivers for--.

Signed and Sealed this

Seventh Day of November, 2000

Attest:

Q. TODD DICKINSON

Attesting Officer      Director of Patents and Trademarks